United States Patent
Ranganathan et al.

(10) Patent No.: US 11,658,982 B2
(45) Date of Patent: May 23, 2023

(54) EFFICIENT AUTHENTICATION IN A FILE SYSTEM WITH MULTIPLE SECURITY GROUPS

(71) Applicant: Red Hat, Inc., Raleigh, NC (US)

(72) Inventors: Shyamsundar Ranganathan, Westford, MA (US); Jeffrey Darcy, Lexington, MA (US); Pranith K. Karampuri, Bengaluru (IN); Vijay Bellur, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 994 days.

(21) Appl. No.: 15/726,980

(22) Filed: Oct. 6, 2017

(65) Prior Publication Data
US 2019/0109852 A1 Apr. 11, 2019

(51) Int. Cl.
| | |
|---|---|
| G06F 21/00 | (2013.01) |
| H04L 29/06 | (2006.01) |
| H04L 9/40 | (2022.01) |
| G06F 21/62 | (2013.01) |
| G06F 21/44 | (2013.01) |

(Continued)

(52) U.S. Cl.
CPC ............ *H04L 63/104* (2013.01); *G06F 21/44* (2013.01); *G06F 21/6218* (2013.01); *H04L 9/0894* (2013.01); *H04L 9/3226* (2013.01); *H04L 9/32* (2013.01); *H04L 63/20* (2013.01)

(58) Field of Classification Search
CPC ..... H04L 63/104; H04L 9/32; G06F 21/6218; G06F 21/44
See application file for complete search history.

(56) References Cited

U.S. PATENT DOCUMENTS

| | | | |
|---|---|---|---|
| 8,762,340 B2 | 6/2014 | Paksoy et al. | |
| 8,850,528 B2 * | 9/2014 | Van Biljon | G06Q 30/04 726/4 |
| 8,966,464 B1 | 2/2015 | Christopher et al. | |

(Continued)

FOREIGN PATENT DOCUMENTS

| | | |
|---|---|---|
| CN | 103064927 B | 10/2016 |
| WO | 2017011015 A1 | 1/2017 |

OTHER PUBLICATIONS

Author Unknown, "Improving NFS Security," Linux Systems, Ppractical unix & internet security, Section 15.4, http://etutorials.org/Linux+systems/unix+internet+security/Part+III+Network+and+Internet+Security/Chapter+15.+Network+Filesystems/15.4+Improving+NFS+Security/, Accessed Sep. 14, 2017, eTutorials.org, 8 pages.

(Continued)

*Primary Examiner* — Philip J Chea
*Assistant Examiner* — Rodman Alexander Mahmoudi
(74) *Attorney, Agent, or Firm* — Dority & Manning, P.A.

(57) ABSTRACT

Efficient authentication in a file system with multiple security groups is disclosed. A file system (FS) executing on at least one processor device receives, from a first client application of a plurality of client applications, a request to access a first object, the request including a unique object ID that identifies the first object. The FS determines, based on a data structure maintained by the FS and inaccessible to the first client application, that the first client application is associated with a first security group of a plurality of different security groups. The FS determines, based on metadata of the first object, that the first object is associated with the first security group, and grants the first client application access to the first object.

20 Claims, 11 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 9,201,896 B2 | 12/2015 | Darcy et al. | |
| 2005/0262568 A1* | 11/2005 | Hansen | G06F 21/10 |
| | | | 726/26 |
| 2009/0112880 A1* | 4/2009 | Oliveira | G06F 16/13 |
| 2013/0339406 A1* | 12/2013 | Kanfi | G06F 16/122 |
| | | | 707/825 |
| 2015/0019559 A1* | 1/2015 | Maquaire | G06F 16/907 |
| | | | 707/740 |
| 2015/0222604 A1* | 8/2015 | Ylonen | H04L 63/062 |
| | | | 713/171 |
| 2015/0281248 A1* | 10/2015 | Obbard | G06F 16/23 |
| | | | 726/1 |
| 2016/0042194 A1* | 2/2016 | Chakraborty | G06F 3/0605 |
| | | | 726/17 |
| 2016/0099963 A1* | 4/2016 | Mahaffey | H04L 63/0227 |
| | | | 726/25 |
| 2017/0061146 A1 | 3/2017 | Lu et al. | |
| 2017/0185629 A1 | 6/2017 | Nevolin | |
| 2017/0235509 A1* | 8/2017 | Chittenden | G06F 3/0622 |
| | | | 711/163 |
| 2017/0270184 A1* | 9/2017 | Huang | G06F 16/901 |

OTHER PUBLICATIONS

Author Unknown, "Why should I disable subtree checking on my NFS server exports?," Linux NFS faq, Section C7, nfs.sourceforge.net/, Accessed on Sep. 14, 2017, 1 page.
Author Unknown, "Linux NFS Overview, FAQ and HOWTO Documents," Linux NFS faq, nfs.sourceforge.net, Accessed Sep. 14, 2017, 23 pages.
Darcy, Jeff, "Building a Cloud File System,";login:, vol. 36, Issue 3, Jun. 2011, USENIX, pp. 14-21.
Kappes, Georgios, "Scalable Access Control for Secure Multi-Tenant Filesystems," Masters of Science Thesis, Oct. 2013, 119 pages.
Traeger, Avishay, et al., "NFS File Handle Security," Technical Report FSL-04-03, www.fsl.cs.stonybrook.edu/docs/nfscrack-tr/index.html, Accessed on Sep. 14, 2017, Stony Brook University, 18 pages.

* cited by examiner

EFFICIENT AUTHENTICATION IN A FILE SYSTEM WITH MULTIPLE SECURITY GROUPS

TECHNICAL FIELD

The examples relate generally to file system authentication and, in particular, to efficient object authentication in a file system with multiple security groups.

BACKGROUND

Often data storage resources are shared among different groups that need to be isolated from one another such that one group cannot access the data of another group. As an example, a cloud computing service often utilizes a file system that manages the storage of files, and that manages access control to such files, for a number of different companies that are concurrently utilizing the cloud computing service. Proper access control ensures that files associated with one company are not accessed by applications of another company.

SUMMARY

The examples disclosed herein implement object authentication in an efficient manner without a need to traverse a path of an object to locate a parent object in order to authenticate an access request.

In one example a method is provided. The method includes receiving, by a file system (FS) executing on at least one processor device, from a first client application of a plurality of client applications, a first request to access a first object, the first request including a unique object ID that identifies the first object. The method further includes determining, based on a data structure maintained by the FS and inaccessible to the first client application, that the first client application is associated with a first security group of a plurality of different security groups. The method further includes determining, based on metadata of the first object, that the first object is associated with the first security group, and granting the first client application access to the first object.

In another example a computing device is provided. The computing device includes a communications interface to communicate with a network and a processor device coupled to the communications interface. The processor device is to receive, from a first client application of a plurality of client applications, a request to access a first object, the request to access the first object including a unique object ID that identifies the first object. The processor device is further to determine, based on a data structure maintained by the processor device and inaccessible to the first client application, that the first client application is associated with a first security group of a plurality of different security groups. The processor device is further to determine, based on metadata of the first object, that the first object is associated with the first security group, and grant the first client application access to the first object.

In another example a computer program product stored on a non-transitory computer-readable storage medium is provided. The computer program product includes instructions to cause a processor device to receive, from a first client application of a plurality of client applications, a request to access a first object, the request to access the first object including a unique object ID that identifies the first object. The instructions further cause the processor device to determine, based on a data structure maintained by the processor device and inaccessible to the first client application, that the first client application is associated with a first security group of a plurality of different security groups. The instructions further cause the processor device to determine, based on metadata of the first object, that the first object is associated with the first security group, and grant the first client application access to the first object.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
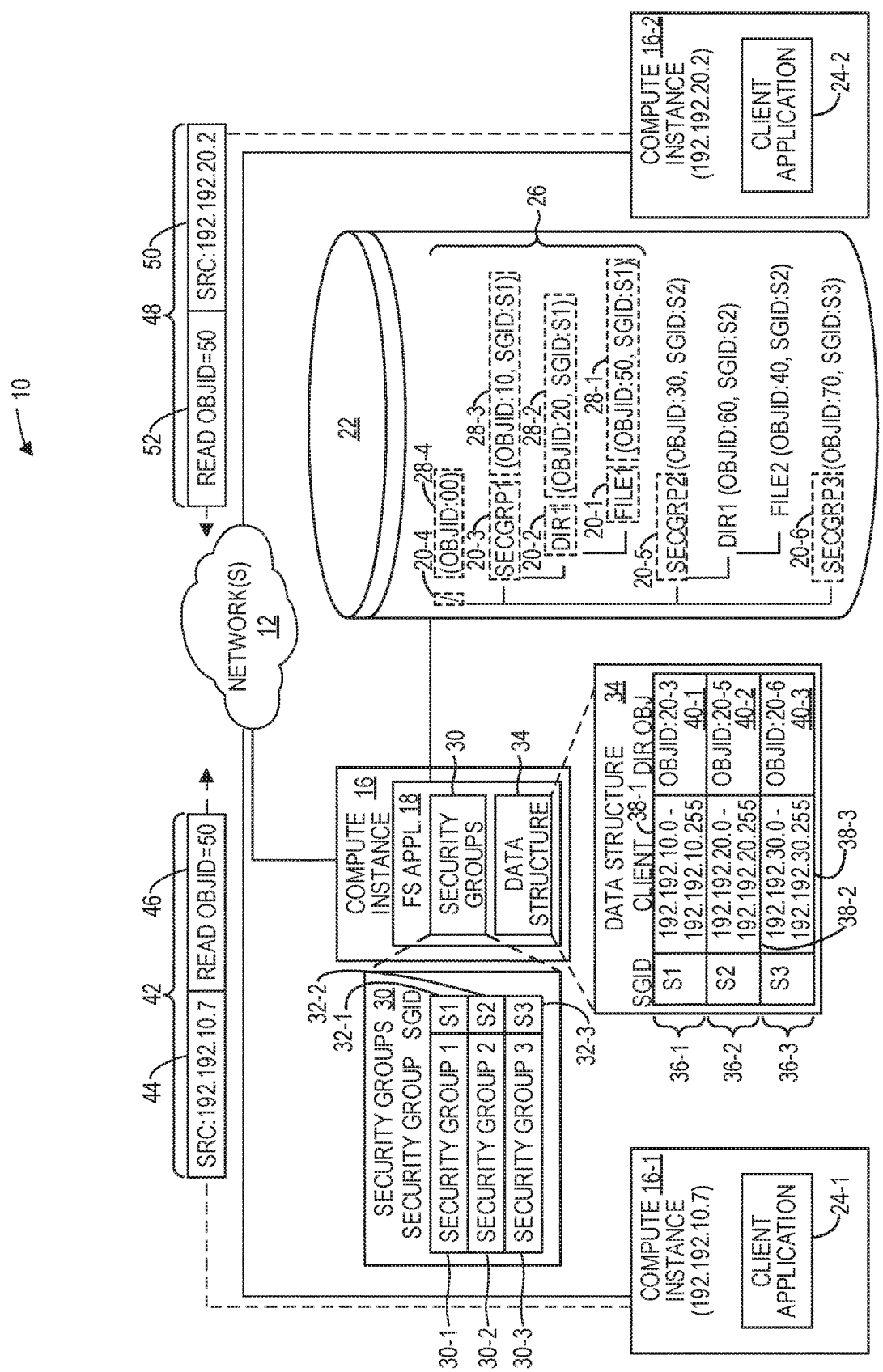
FIG. 1 is a block diagram of an environment in which examples can be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first object" and "second object," and does not imply a priority, a type, an importance, or other attribute, unless otherwise stated herein. As used herein and in the claims, the articles "a" and "an" in reference to an element refers to "one or more" of the element unless otherwise explicitly specified.

Often data storage resources are shared among different groups, referred to herein as security groups, that need to be isolated from one another such that one security group cannot access the data of another security group. As an example, a cloud computing service often utilizes a file system that manages the storage of files, and access control to such files, for a number of different companies that are concurrently utilizing the cloud computing service. In such an example, each company is a different security group, and cloud applications associated with one company should not be able to access objects of another company that are stored in the file system.

Many file systems implement access control based on the security associated with a root directory of an object hierarchy. Determining whether a requestor who requests access to an object in the object hierarchy, such as a directory object or a file object, is authorized to access the object involves accessing the root directory to determine whether the requestor is permitted to access the root directory. Traversing backwards through an object hierarchy to the root directory, however, can be time-consuming and is not very scalable, such that as the number of stored objects in an object hierarchy increases, the longer it takes to traverse object hierarchies.

Accessing an object hierarchy in a distributed file system, such as Gluster, wherein objects can be spread across multiple storage nodes, can be time-consuming and can involve having to fetch metadata associated with each object in the object hierarchy to traverse the object hierarchy. Thus, multiple read operations, or memory fetches, may be necessary to obtain the metadata associated with each object in the object hierarchy up to the root directory to properly authenticate the requestor.

One potential solution to this problem is to generate a unique object identifier (ID) that uniquely identifies an object, such as a directory object or a file object, and require that the unique object ID be provided along with the request to access the object. If the unique object ID in the request matches the unique object ID of the object, it may be assumed that the requestor is authorized. However, this technique is susceptible to malicious attackers who obtain the unique object ID either by "sniffing" a network looking for object access requests that contain unique object IDs, or are able to, through brute force, correctly derive a unique object ID that matches the unique object ID associated with an object in the file system.

The examples disclosed herein provide efficient authentication in a file system with multiple security groups without a need to traverse an object hierarchy to authenticate object access. The examples associate with each object in a file system a security group ID that identifies a security group with which the object is associated. This may, for example, occur at creation time of the object. The security group ID is stored in the metadata of the object. When the file system receives a request to access an object from a client application, the file system utilizes information in the request, and a data structure that is inaccessible to the client application, to determine a security group ID associated with the client application. The file system also accesses the metadata of the object, and if the security group ID associated with the client application matches the security group ID associated with the object, the file system grants access to the object. Notably, the file system need not traverse a hierarchy of objects to access a root directory object in order to determine whether the client application is authorized to access the object. Moreover, because the file system uses information associated with the request in conjunction with information in a data structure to determine the security group ID of the client application, merely providing a valid unique object ID by a malicious application will not result in obtaining access to the object.

FIG. 1 is a block diagram of an environment 10 in which examples can be practiced. The environment 10 includes a network 12 to which a plurality of compute instances 16, 16-1 and 16-2 are communicatively coupled. A compute instance, as discussed herein, refers to a discrete runtime environment, and may comprise a physical machine configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance thus, whether a physical machine or a virtual machine, includes a memory and a processor device.

The compute instance 16 includes a file system (FS) application 18 (hereinafter FS 18) that manages objects 20 stored on a storage node 22 which are utilized by client applications 24-1, 24-2 of the compute instances 16-1, 16-2, respectively. Such objects 20 may include, for example, directory objects 20 and file objects 20. The objects 20 are typically maintained in a path of objects 20 from a root object 20 to a final object 20. A directory object 20 "contains" other directory objects 20 and/or file objects 20. Typically, a file object 20 is stored in a directory object 20. An example of a file object 20 is a file object 20-1 (FILE1). The file object 20-1 is stored in a directory object 20-2 (DIR1). The directory object 20-2 is stored in a directory object 20-3 (SECGRP1). The directory object 20-3 is stored in a root directory object 20-4 (/). Thus, a path 26 of objects 20 from the root directory object 20-4 to the file object 20-1 may be represented as "/SECGRP1/DIR1/FILE1".

Directory objects 20 are primarily a mechanism for organizing objects 20 into a logical structure, and thus the phrase "stored in" with regard to a directory object 20 is a logical relationship rather than a physical relationship, in that the file object 20-1 may be stored on the storage node 22 physically apart from the directory object 20-2. The directory object 20-2 may be a data structure with a pointer, or other reference, to the file object 20-1 to establish the logical relationship that indicates that the file object 20-1 is stored in the directory object 20-2. Each of the objects 20 has associated metadata 28-1-28-4 (generally, metadata 28). For purposes of illustration the metadata 28 is illustrated in conjunction with the objects 20. However, the FS 18 may store the metadata 28 separately from the objects 20. Whether stored together or separately, however, each object 20 has its own metadata 28 that is associated with that respective object 20. In conventional file systems, access control may be based on a higher level directory object 20, such as the root directory object 20-4. If a conventional file system receives a request to access an object 20 from a client application 24, such as a request to access the file object 20-1, the file system application may have to traverse through the metadata of the directory objects 20-2 and 20-3 to locate the root directory object 20-4. The file system may then determine whether the client application 24-1 has rights to access objects 20 that are contained within the root directory object 20-4, and, based on this, decide whether to grant the request or deny the request. While for purposes of illustration the file object 20-1 is the fourth object 20 in the path of objects 20, there can be any number of objects 20 in the path of a file object 20. One problem with this access control approach is that as the number of objects 20 grows, the file system must analyze the metadata 28 associated with an ever growing number of objects 20 to determine the relevant root object 20, and thus is not scalable.

The examples disclosed herein eliminate the need to traverse the path 26 of objects 20 to determine authentication rights for the file object 20-1. In the disclosed examples, the FS 18 determines access control rights of an object 20 based, in part, on a security group 30-1-30-3 (generally, security groups 30) with which the object 20 is associated and a security group 30 with which a client application 24 is associated. Security groups 30 are used to isolate objects 20 that are associated with one entity from the objects 20 associated with another entity. A security group 30 can correspond to any desired categories of entities, such as different departments in a company, for example. For example, the security group 30-1 may be created for the finance department and the security group 30-2 for the human resources (HR) department, thereby preventing access by finance department users of objects 20 associated with the HR department, and preventing access by HR department users of objects 20 associated with finance department. As another example, in a multi-tenant environment 10, such as in the context of a cloud-based service provider who provides cloud services to a number of different tenants (e.g., companies), each tenant may be associated with a different security group 30 to ensure that the employees of one tenant cannot access the objects 20 that are associated with another tenant, even though objects 20 associated with both tenants may be physically stored on the same storage nodes 22.

In this example, three security groups 30 have been defined. In some examples, an administrator of the FS 18 may create security groups 30 via, for example, a user interface of the FS 18. In one example, the FS 18 generates a unique security group identifier (SGID) 32-1-32-3 (generally, SGIDs 32) for each security group 30.

The FS 18 also maintains a data structure 34 in which information related to the security groups 30 is stored. For example, the data structure 34 contains entries 36-1-36-3 (generally, entries 36), which correspond respectively to security groups 30-1-30-3. Each entry 36 contains an SGID 32 that uniquely identifies the security group 30 with which the entry 36 corresponds, a client application field 38-1-38-3 which identifies the client applications 24 associated with the corresponding security group 30, and a directory object field 40-1-40-3 which identifies a particular directory object 20 of the FS 18 in which all objects 20 that are associated with the corresponding security group 30 will be stored.

The SGID 32 is stored as metadata that is associated with each object 20 to identify the particular security group 30 with which the object 20 is associated. Examples of the use of the SGID 32 for authentication purposes will be discussed below. The client application field 38 contains information that identifies which client applications 24 are associated with which security groups 30. The client application field 38 may contain any suitable information that can reliably distinguish one client application 24 from another client application 24. Such information may be an attribute that is inherent in the connection of the client application 24, such as an IP address, a port number, or information that is provided by the client application 24 such as a user identifier, a security certificate, or the like. This information may be provided by an administrator during the generation of the security group 30, or may be derived during connection of the client application 24 to the FS 18.

The directory object field 40 identifies a unique object ID of a directory object 20 under which all new objects 20 associated with the respective security group 30 will be created. In particular, in one example, the FS 18, when generating a new security group 30, automatically generates a directory object 20 under the root directory object 20-4 in which all objects 20 generated by client applications 24 that are associated with such new security group 30 will store objects 20. In this example, the directory object 20-3 was generated in conjunction with the creation of the security group 30-1, the directory object 20-5 was generated in conjunction with the creation of the security group 30-2, and the directory object 20-6 was generated in conjunction with the creation of the security group 30-3.

In one example, prior to accessing the objects 20, each client application 24 connects to the FS 18. The particular connection mechanism may vary depending on the particular environment 10, but it may involve, for example, a secure access mechanism that involves the exchange of a user identifier and password, or the exchange of and verification of public/private keys, or any other suitable mechanism. Upon establishment of the connection, the FS 18 may utilize information associated with the connection, such as, in this case, the IP address of the client application 24 to associate the client application 24 with a corresponding security group 30. Again, the information used may be any suitable information, including information that the client application 24 is assigned during the connection phase, and subsequently includes in each subsequent request. While in this example the data structure 34 illustrates a single entry 36 for each security group 30, in other examples, the data structure 34 may contain a separate entry 36 for each client application 24 connected to the FS 18.

The subsequent information used by the FS 18 to identify the client application 24 may be generated, derived, or determined during the connection process when the client application 24 connects to the FS 18. The information may be saved by the FS 18 and then later utilized by the FS 18 to later determine the security group 30 associated with a request from the client application 24. Preferably, each request includes information that the FS 18 can then utilize to identify the client application 24 and thereby associate the client application 24 with a particular security group 30.

For purposes of illustration of the efficient authentication implemented by the FS 18 using security groups 30, assume that the client application 24-1 has been authenticated and has a connection with the FS 18. The client application 24-1 generates a request 42 to access the file object 20-1. The request 42 includes an IP address 44 used by the client application 24-1, and an access request command 46 to read the file object 20-1. The access request command 46 includes the unique object ID (50) that uniquely identifies the file object 20-1.

The FS 18 receives the request 42, and, based on the IP address 44 and the client application field 38-1 which identifies a range of IP addresses that includes the IP address 44, determines that the client application 24-1 is associated with the security group 30-1. In one example, this determination may be made via the SGID 32-1 which contains the unique identifier of the security group 30-1. In other examples, the determination may be made by accessing the directory object field 40-1 to determine the directory object 20 associated with the security group 30-1, and then accessing the metadata 28-3 (in this example) to determine the SGID 32-1 identified in the metadata 28-3.

The FS 18 then accesses the metadata 28-1 associated with the file object 20-1 and determines that the SGID S1 matches the SGID 32 associated with the client application 24-1. Based on this determination, the FS 18 allows the client application 24-1 to read the file object 20-1. Note that the FS 18 does not access the metadata 28 of any parent object of the file object 20-1. Moreover, note that the information in the data structure 34 is not accessible to the client application 24-1, and thus the client application 24-1 cannot alter the information in the data structure 34. In fact, the concept of security groups 30 is completely unknown to the client application 24-1.

As another example, assume that the client application 24-2 has connected to the FS 18 and generates a request 48 to access the file object 20-1. The request 48 includes an IP address 50 used by the client application 24-2, and an access request command 52 to read the file object 20-1. The access request command 52 includes the unique object ID (50) that uniquely identifies the file object 20-1.

The FS 18 receives the request 48, and, based on the IP address 50 and the client application field 38-2 which identifies a range of IP addresses that includes the IP address 50, determines that the client application 24-2 is associated with the security group 30-2. The FS 18 then accesses the metadata 28-1 associated with the file object 20-1 and determines that the SGID S1 does not match the SGID S2 associated with the client application 24-2. Based on this determination, the FS 18 denies the request 48 to access the file object 20-1.

It should be noted that because the FS 18 is a component of the compute instance 16, functionality implemented by the FS 18 may be attributed to the compute instance 16 generally. Moreover, in examples where the FS 18 comprises software instructions that program a processor device to carry out functionality discussed herein, functionality implemented by the FS 18 may be attributed generally to such processor device.

Figure 2:
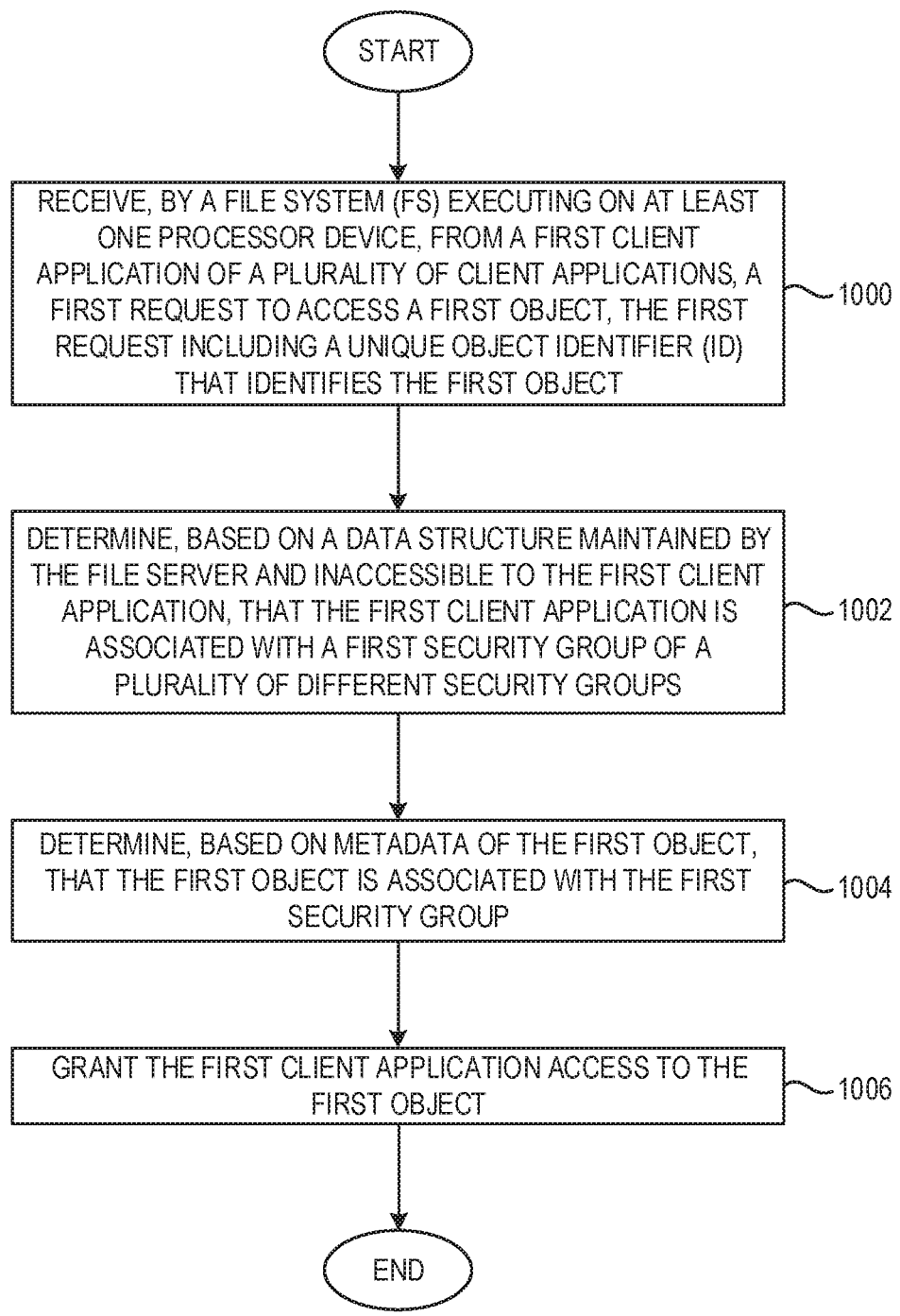
FIG. 2 is a flowchart of a method for efficient authentication in a file system (FS) with multiple security groups according to one example.

FIG. 2 is a flowchart of a method for efficient authentication in a file system with multiple security groups according to one example. FIG. 2 will be discussed in conjunction with FIG. 1. The FS 18 receives, from the client application 24-1, the request 42 to access the file object 20-1, the request 42 including a unique object ID that identifies the file object 20-1 (FIG. 2, block 1000). The FS 18 determines, based on the data structure 34 maintained by the FS 18 and inaccessible to the client application 24-1, that the client application 24-1 is associated with the security group 30-1 (FIG. 2, block 1002). The FS 18 determines, based on the metadata 28-1 of the file object 20-1, that the file object 20-1 is associated with the security group 30-1, and grants the client application 24-1 access to the file object 20-1 (FIG. 2, blocks 1004-1006).

Figure 3:
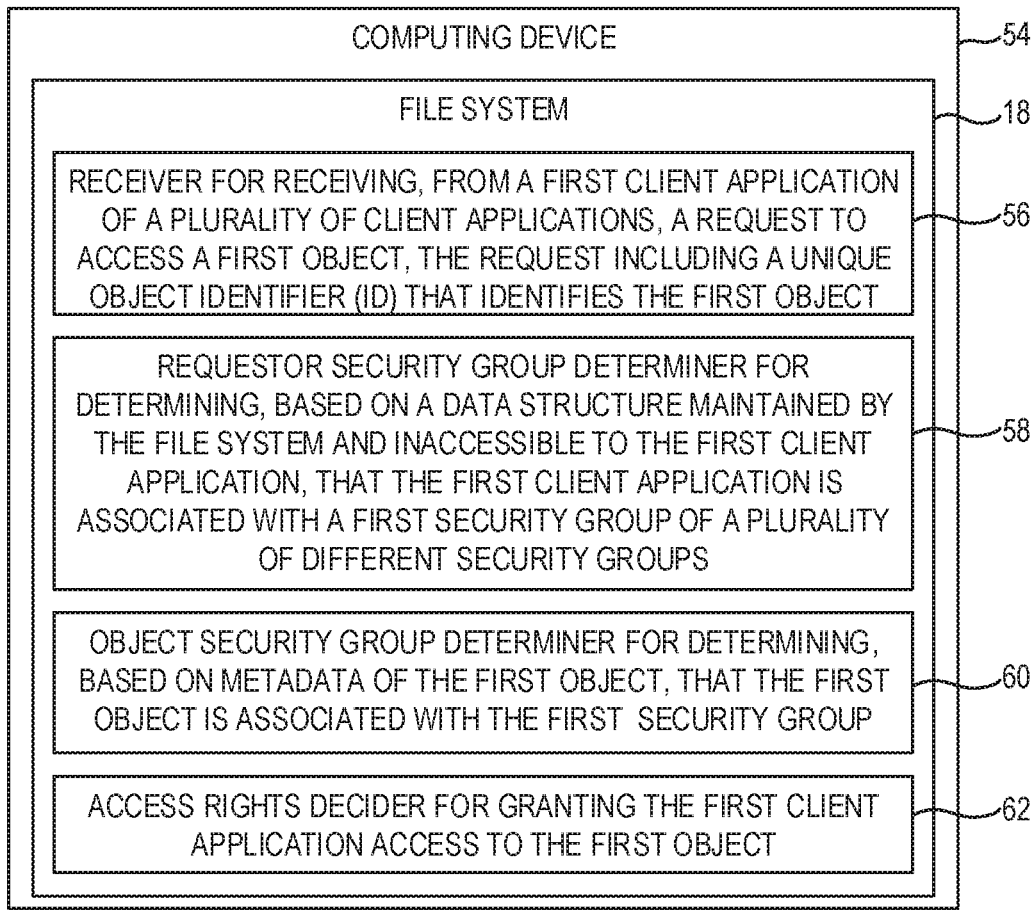
FIG. 3 is a block diagram of a computing device suitable for implementing aspects of the examples.

FIG. 3 is a block diagram of a computing device 54 suitable for implementing aspects of the examples. The computing device 54 includes the FS 18. The FS 18 includes a receiver 56 for receiving, from the client application 24-1 of a plurality of client applications 24, the request 42 to access the file object 20-1, the request 42 including a unique object ID that identifies the file object 20-1. The FS 18 also includes a requestor security group determiner 58 for determining, based on the data structure 34 maintained by the FS 18 and inaccessible to the client application 24-1, that the client application 24-1 is associated with the security group 30-1 of the plurality of different security groups 30. The FS 18 also includes an object security group determiner 60 for determining, based on the metadata 28-1 of the file object 20-1, that the file object 20-1 is associated with the security group 30-1. The FS 18 also includes an access rights decider 62 for granting the client application 24-1 access to the file object 20-1.

Figure 4:
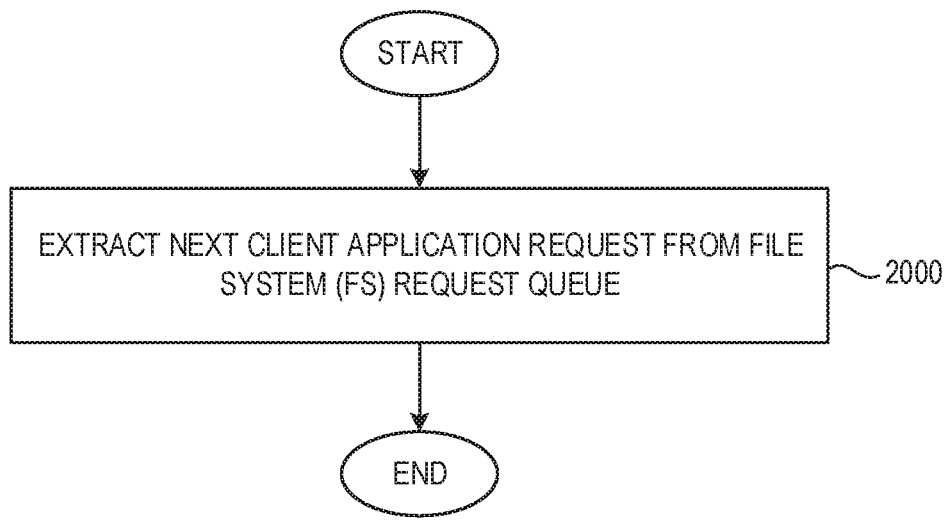
FIG. 4 is a flowchart of a method for implementing a receiver illustrated in FIG. 3 according to one example.

FIG. 4 is a flowchart of a method for implementing the receiver 56 illustrated in FIG. 3 according to one example. In one example, the receiver 56 receives requests from the client applications 24 and inserts the requests into a queue for processing. After all previously queued requests have been processed, the receiver 56 extracts the request 42 from the queue (FIG. 4, block 2000).

Figure 5:
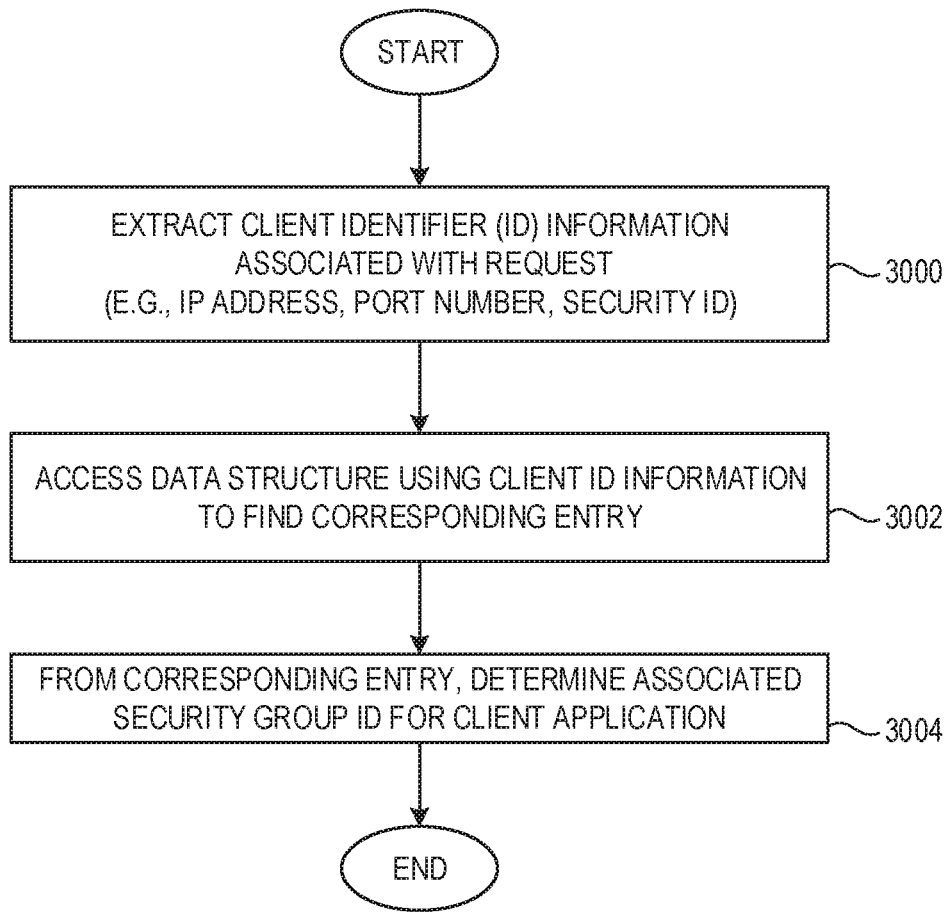
FIG. 5 is a flowchart of a method of a process for implementing a requestor security group determiner illustrated in FIG. 3 according to one example.

FIG. 5 is a flowchart of a method of a process for implementing the requestor security group determiner 58 illustrated in FIG. 3 according to one example. The requestor security group determiner 58, in one example, extracts the client ID information that is associated with the request 42 (FIG. 5, block 3000). In this example, the client ID information is the source IP address of the request 42, in particular, the IP address of the client application 24-1. In other examples the client ID information may be other information that is included in the request 42, such as a unique ID that was provided to the client application 24-1 during the connection stage, a security token authenticated during the connection stage, or any other data that uniquely identifies the client application 24-1.

The requestor security group determiner 58 accesses the data structure 34 using the client ID information determined in block 3000 to find a corresponding entry 36, in this example the entry 36-1 because the IP address of the client application 24-1 is within the range of IP addresses identified in the client application field 38-1 (FIG. 5, block 3002). Based on the entry 36-1, the requestor security group determiner 58 determines that the associated SGID for the client application 24-1 is the SGID S1 of the security group 30-1 (FIG. 5, block 3004).

Figure 6:
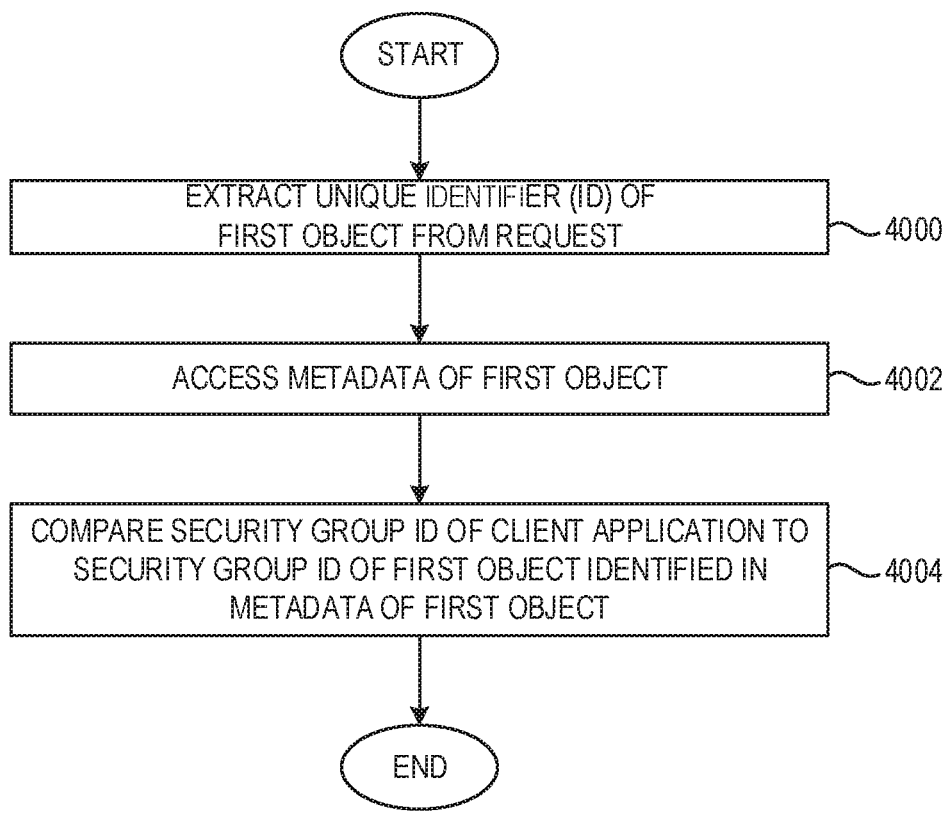
FIG. 6 is a flowchart of a method for implementing an object security group determiner illustrated in FIG. 3 according to one example.

FIG. 6 is a flowchart of a method for implementing the object security group determiner 60 illustrated in FIG. 3 according to one example. The object security group determiner 60 extracts the unique object ID of the file object 20-1 from the access request command 46 of the request 42 (block 4000). The object security group determiner 60 accesses the metadata 28-1 of the file object 20-1 (block 4002). The object security group determiner 60 compares the SGID identified in block 3004 of FIG. 5 with the object ID identified in the metadata 28-1 of the file object 20-1 (block 4004).

Figure 7:
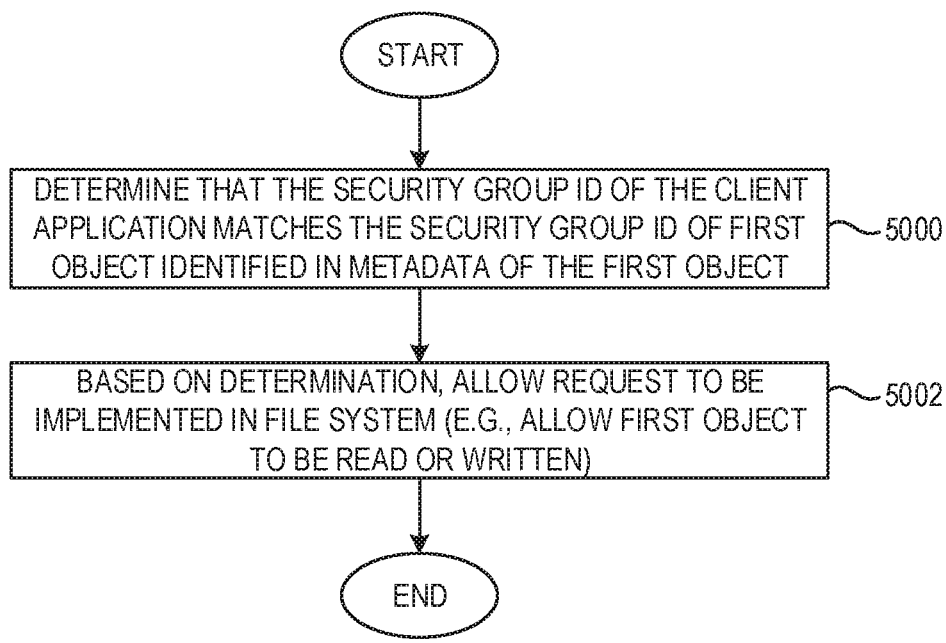
FIG. 7 is a flowchart of a method for implementing an access rights decider illustrated in FIG. 3 according to one example.

FIG. 7 is a flowchart of a method for implementing the access rights decider 62 illustrated in FIG. 3 according to one example. The FS 18 determines that the SGID of the client application 24-1 matches the SGID of the file object 20-1 identified in the metadata 28-1 of the file object 20-1 (block 5000). Based on this determination, the FS 18 allows the request 42 to be implemented (block 5002). In this example, the FS 18 reads the file object 20-1 and provides the result to the client application 24-1.

Figure 8:
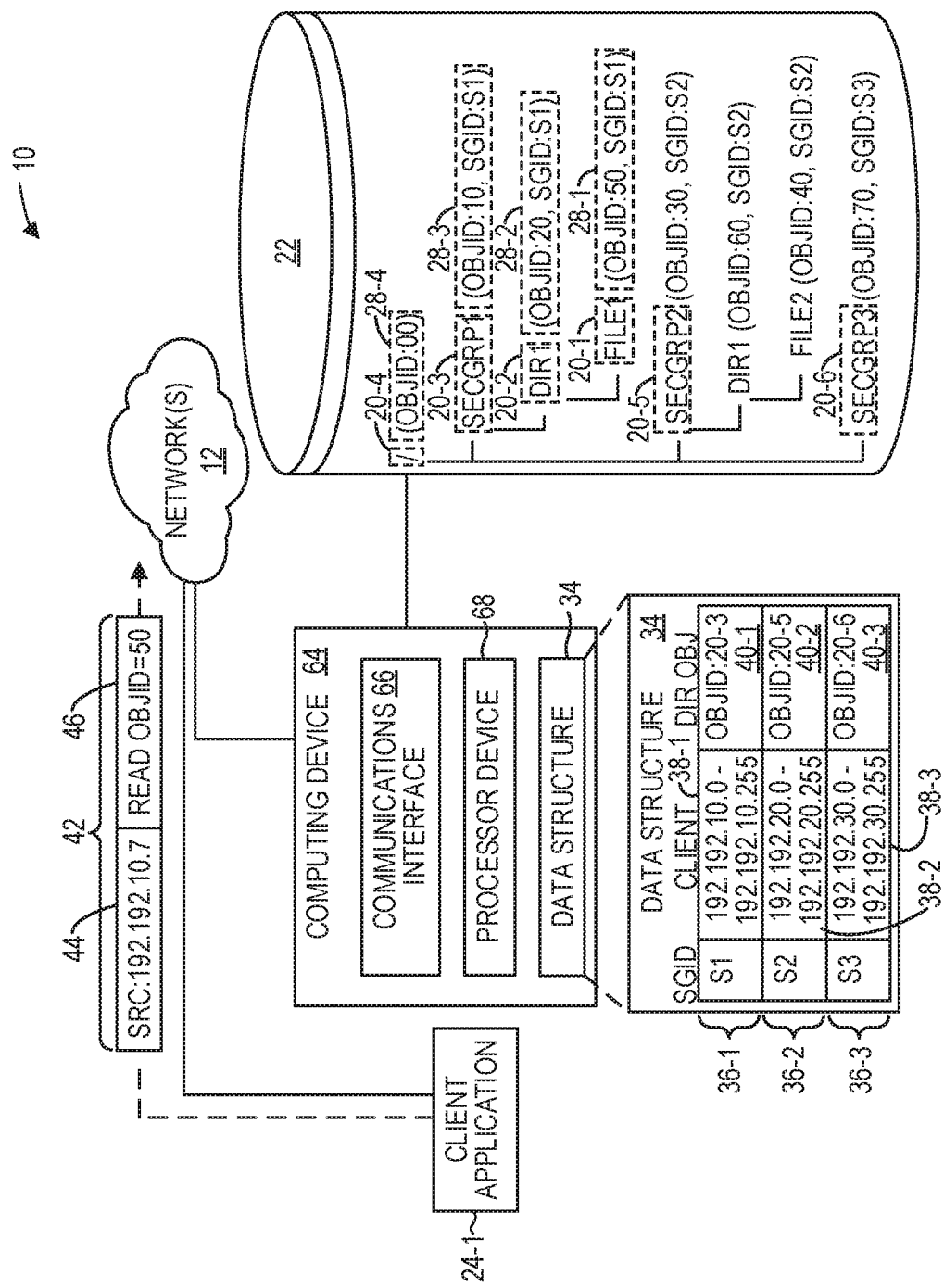
FIG. 8 is a simplified block diagram of the environment illustrated in FIG. 1 according to one example.

FIG. 8 is a simplified block diagram of the environment 10 illustrated in FIG. 1 according to one example. In this example, the compute instance 16-1 illustrated in FIG. 1 is implemented as a computing device 64. The computing device 64 includes a communications interface 66 to communicate with the network 12, and a processor device 68. The processor device 68 is to receive, from the client application 24-1 of the plurality of client applications 24, the request 42 to access the file object 20-1, the request 42 including a unique object ID that identifies the file object 20-1. The processor device 68 is further to determine, based on the data structure 34 maintained by the processor device 68 and inaccessible to the client application 24-1, that the client application 24-1 is associated with the security group 30-1 of the plurality of different security groups 30. The processor device 68 is further to determine, based on the metadata 28-1 of the file object 20-1, that the file object 20-1 is associated with the security group 30-1, and grant the client application 24-1 access to the file object 20-1.

Figure 9:
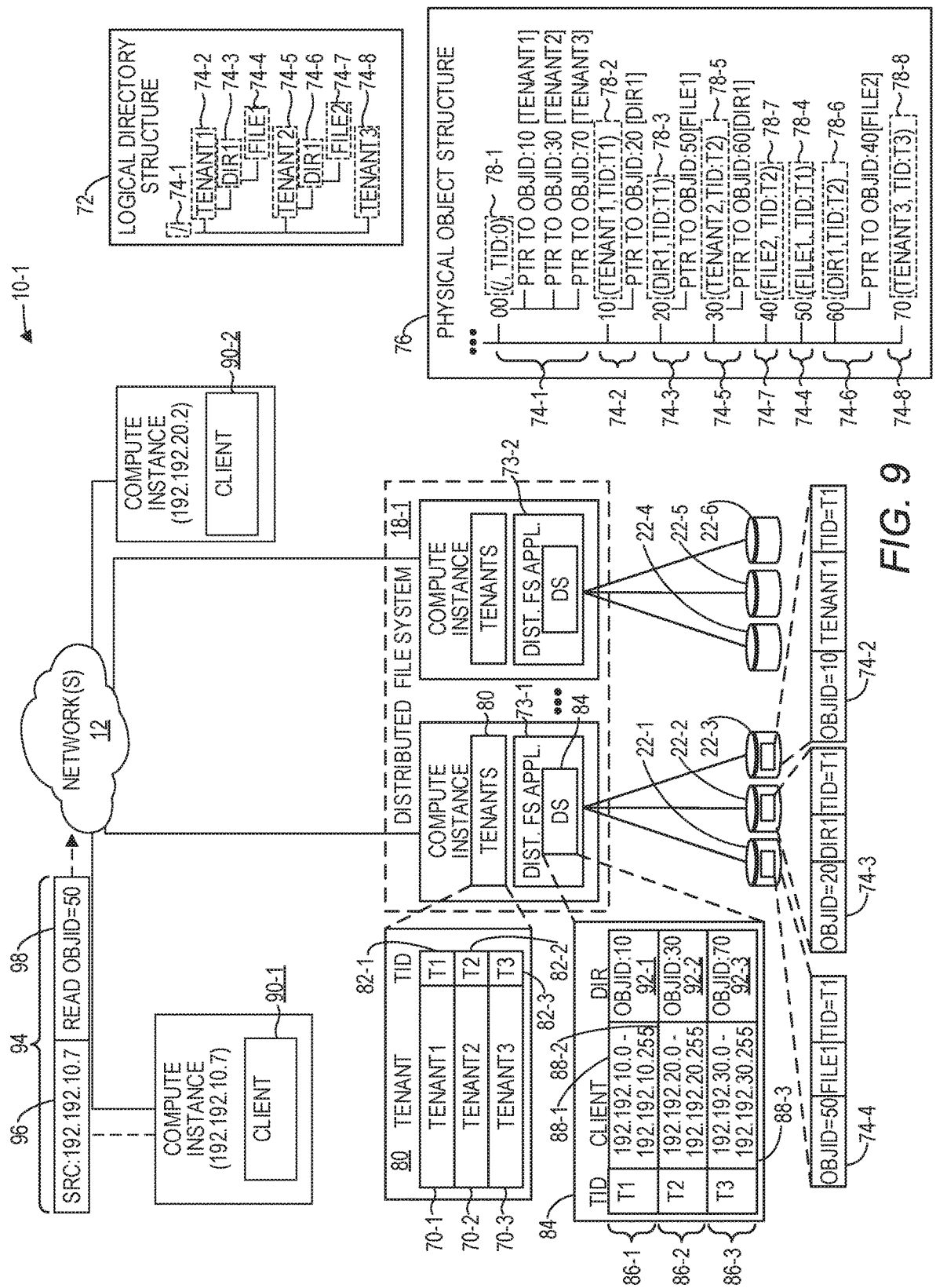
FIG. 9 is a block diagram of a multi-tenant environment according to one example.

FIG. 9 is a block diagram of an environment 10-1 according to another example. The environment 10-1 is similar to the environment 10 except as otherwise discussed herein. In this example security groups 30 (FIG. 1) are implemented based on tenants 70-1-70-3. Each tenant 70 is a separate security group. Each tenant 70 has an associated unique tenant ID 82-1-82-3, analogous to the SGIDs 32-1-32-3 illustrated in FIG. 1. The environment 10-1 includes a multi-tenant distributed FS 18-1 that provides object access services to the plurality of different tenants 70. The environment 10-1 may be implemented, for example, in a cloud environment, and the tenants 70 may be, for example, different companies that utilize cloud services. It is desirable that objects associated with one tenant 70 not be accessible to the objects of another tenant 70. The distributed FS 18-1 includes one or more FS applications 73-1, 73-2, each of which distributes objects over a plurality of different storage nodes 22-1-22-6, without regard to where in a path of objects from a root object to a final object the particular object exists. In other words, a directory object may be located on one storage node 22, and a file object stored in such directory object may be located on another storage node 22. In some examples, aspects of the distributed FS 18-1 may be implemented by Gluster, available at www-.gluster.com.

In one example, to determine the storage node 22 on which to store a new object, the FS 18-1 utilizes a hashing algorithm to hash the name of the object to derive a hash value. A node assignment table assigns ranges of potential hash values to different storage nodes 22, and the storage node 22 is selected based on the storage node 22 to which the hash value is assigned. This is a random process which results in relatively even spreading of objects across the storage nodes 22 of the FS 18-1 and is thus very scalable.

FIG. 9 illustrates a logical representation 72 of a plurality of objects 74-1-74-8 (generally, objects 74). The objects 74 have many of the same characteristics as the objects 20 as discussed above with regard to FIG. 1, except as otherwise discussed herein. The logical representation 72 is provided for purposes of easily understanding the relationships between such objects 74, however, the objects 74 are not stored in accordance with the logical representation 72, and are instead stored in accordance with a physical representation 76. The physical representation 76 identifies relationships between the objects 74-1-74-8, and associated metadata 78-1-78-8, but without indication of where on the storage nodes 22 such objects 74 are stored. For example, the physical representation 76 illustrates the object 74-2 (TENANT1) as having an object ID of 10, and including a pointer to the object 74-3 (DIR1) having the object ID of 20. The pointer indicates that the object 74-2 is a directory that "contains" the object 74-3. The object 74-2 also has associated metadata 78-2 which, in this example identifies the object 74-2 as having a tenant ID (TID) of T1 which identifies the tenant 70-1, and thus the object 74-2 is associated with the tenant 70-1 (TENANT1).

The object 74-3 (DIR1) has an object ID of 20, and includes a pointer to the object 74-4 (FILE1) having the object ID of 50. The pointer indicates that the object 74-3 (DIR1) is a directory that "contains" the object 74-4 (FILE1). The metadata 78-3 associated with the object 74-3 (DIR1) identifies the object 74-3 (DIR1) as being identified with the tenant 70-1 (TENANT1). The metadata 78-4 associated with the object 74-4 (FILE1) identifies the object 74-4 (FILE1) as being identified with the tenant 70-1 (TENANT1).

In this example, the objects 74-2 (TENANT1), 74-3 (DIR1), and 74-4 (FILE1) are a set of objects 74 that form a path from the object 74-2 to the object 74-4. However, note that the object 74-2 is stored on the storage node 22-3, the object 74-3 is stored on the storage node 22-2, and the object 74-4 is stored on the storage node 22-1.

The FS 18-1 maintains a structure 80 that identifies the tenants 70-1-70-3. A tenant 70 may be added to the structure 80 as a new tenant subscribes to cloud services, for example. Each new tenant 70 is provided a unique tenant ID (TID) 82-1-82-3, which serves substantially the same purpose as the SGIDs 32 discussed above with regard to FIG. 1. In particular, each new object 74 created by the FS 18-1 has the TID 82 stored in the associated metadata 78.

The FS application 73-1 maintains a data structure 84 in which information related to the tenants 70 is stored. For example, the data structure 84 contains entries 86-1-86-3 that correspond respectively to the tenants 70-1-70-3. Each entry 86 contains a TID 82 that uniquely identifies the tenant 70 with which the entry 86 corresponds, a client field 88-1-88-3 which identifies clients 90 associated with the corresponding tenant 70, and a directory object field 92-1-92-3 which identifies a particular directory object 74 of the FS 18-1 in which all objects 74 that are associated with the corresponding tenant 70 will be stored.

In this example, clients 90-1, 90-2 may comprise, for example, client applications, virtual machines, containers implemented via a containerization technology, such as Docker containerization technology, or the like. Clients 90 may be initiated and terminated by a cloud service (not illustrated) dynamically as demand for the services provided by the particular clients 90 fluctuates.

The TID 82 is stored as metadata 78 that is associated with each object 74 to identify the particular tenant 70 with which the object 74 is associated. The client field 88 contains information that identifies which clients 90 are associated with which tenants 70. The client field 88 may contain any suitable information that can reliably distinguish one client 90 from another client 90. Such information may be an attribute that is inherent in the connection of the client 90, such as an IP address, a port number, or information that is provided by the client 90 such as a user identifier, a security certificate, or the like. This information may be provided by an administrator during the generation of the tenant 70, or may be derived during connection of client 90 to the FS 18-1.

The directory object field 92 identifies the unique object ID of a directory object 74 under which all new objects 74 associated with the respective tenant 70 will be created. In particular, in one example, the FS 18-1, when generating a new tenant 70, automatically generates a directory object 74 under the root node object 74-1 in which all objects 74 generated by clients 90 that are associated with such new tenant 70 will store objects 74. In this example, the directory object 74-2 was generated in conjunction with the creation of the tenant 70-1; the directory object 74-5 was generated in conjunction with the creation of the tenant 70-2; and the directory object 74-8 was generated in conjunction with the creation of the tenant 70-3.

In one example, prior to accessing the objects 74, each client 90 connects to the FS 18-1. The particular connection mechanism may vary depending on the particular environment 10-1, but it may involve, for example, a secure access mechanism that involves the exchange of a user identifier and password, or the exchange of and verification of public/private keys, or any other suitable mechanism. Upon establishment of the connection, the FS 18-1 may utilize information associated with the connection, such as, in this case, the IP address of the client 90 to associate the client 90 with a corresponding tenant 70. Again, the information used may be any suitable information, including information that the client 90 is assigned during the connection phase, and subsequently includes in each subsequent request. While in this example the data structure 84 illustrates a single entry 86 for each tenant 70, in other examples, the data structure 84 may contain a separate entry 86 for each client 90 connected to the FS 18-1.

For purposes of illustration of the efficient authentication implemented by the FS 18-1 using tenants 70, assume that the client 90-1 has been authenticated and has a connection with the FS 18-1. The client 90-1 generates a request 94 to access the object 74-4. The request 94 includes an IP address 96 used by the client application 24-1, and an access request command 98 to read the object 74-4. The access request command 98 includes the unique object ID (50) that uniquely identifies the object 74-4.

The FS 18-1 receives the request 98, and, based on the IP address 96 and the client field 88-1 of the entry 86-1, which identifies a range of IP addresses that includes the IP address 96, determines that the client 90-1 is associated with the tenant 70-1. In one example, this determination may be made via the TID 82 identified in the entry 86-1. In other examples, the determination may be made by accessing the directory object field 92-1 of the entry 86-1 to determine the directory object 74 associated with the tenant 70-1, and then accessing the metadata 78-2 (in this example) to determine the TID 82 identified in the metadata 78-2.

The FS 18-1 then accesses the metadata 78-4 associated with the object 74-4 and determines that the TID T1 matches the TID 82 associated with the client 90-1. Based on this determination, the FS 18-1 allows the client 90-1 to read the object 74-4. Note that the FS 18-1 does not access the metadata 78 of any parent object 74 of the object 74-4. Moreover, note that the information in the data structure 84 is not accessible to the client 90-1, and thus the client 90-1 cannot alter the information in the data structure 84. In fact, the concept of tenants 70 is completely unknown to the client 90-1.

Figure 10:
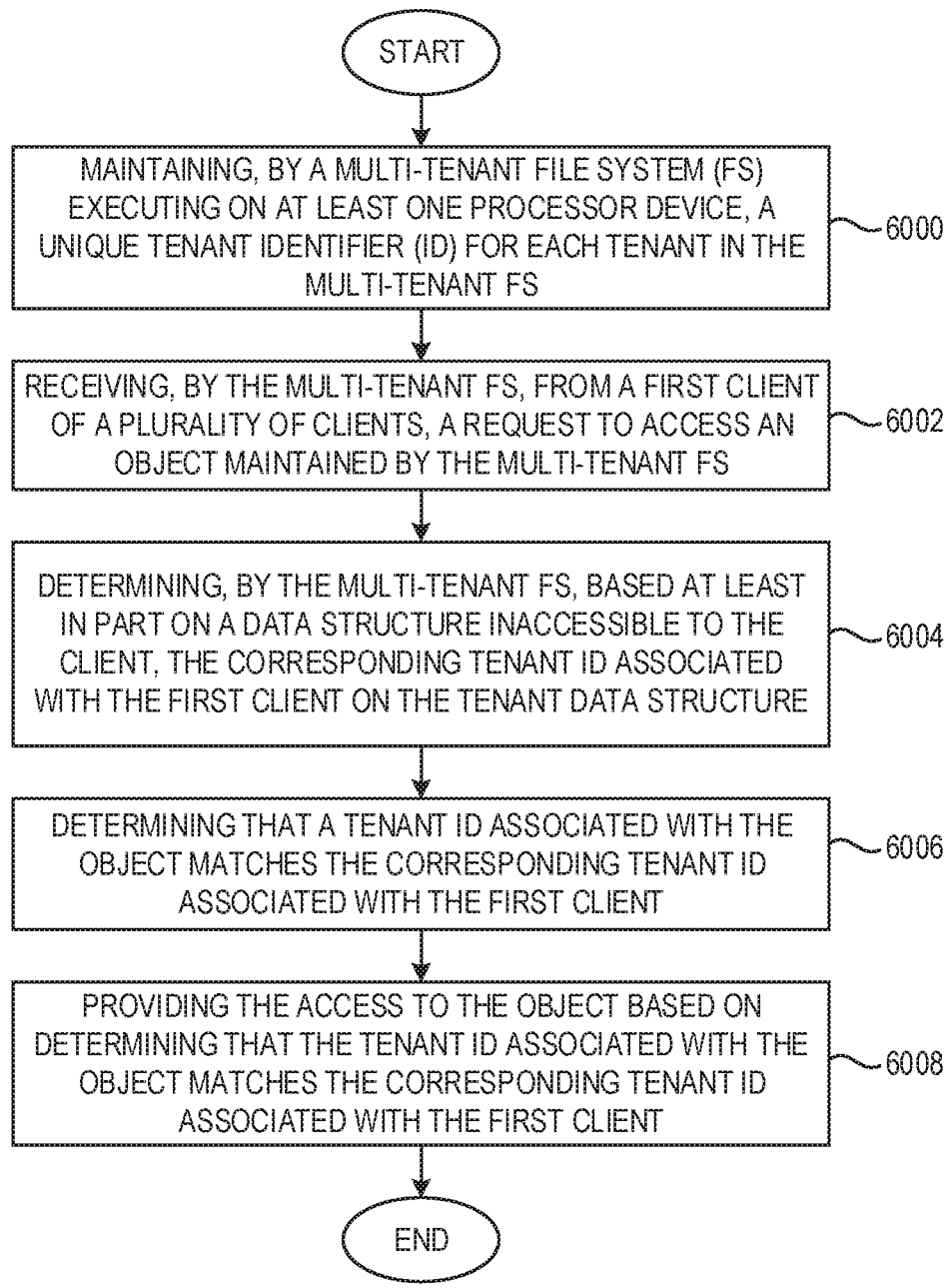
FIG. 10 is a flowchart of a method for efficient authentication in a multi-tenant distributed FS according to one example.

FIG. 10 is a flowchart of a method for efficient authentication in a multi-tenant distributed file system according to one example. FIG. 10 will be discussed in conjunction with FIG. 9. The multi-tenant FS 18-1 maintains a unique TID 82 for each tenant 70 in the multi-tenant FS 18-1 (FIG. 10, block 6000). The multi-tenant FS 81-1 receives, from the client 90-1 of the plurality of clients 90, the request 94 to access the object 74-4 maintained by the multi-tenant FS 18-1 (FIG. 10, block 6002). The multi-tenant FS 18-1 determines, based at least in part on the data structure 84 that is inaccessible to the client 90-1, the corresponding TID 82 associated with the client 90-1 (FIG. 10, block 6004). The multi-tenant FS 18-1 determines that a TID associated with the object 74-4 matches the corresponding TID associated with the client 90-1 (FIG. 10, block 6006). The multi-tenant FS 18-1 provides the requested access to the object 74-4 based on determining that the TID associated with the object 74-4 matches the corresponding TID associated with the client 90-1 (FIG. 10, block 6008).

Figure 11:
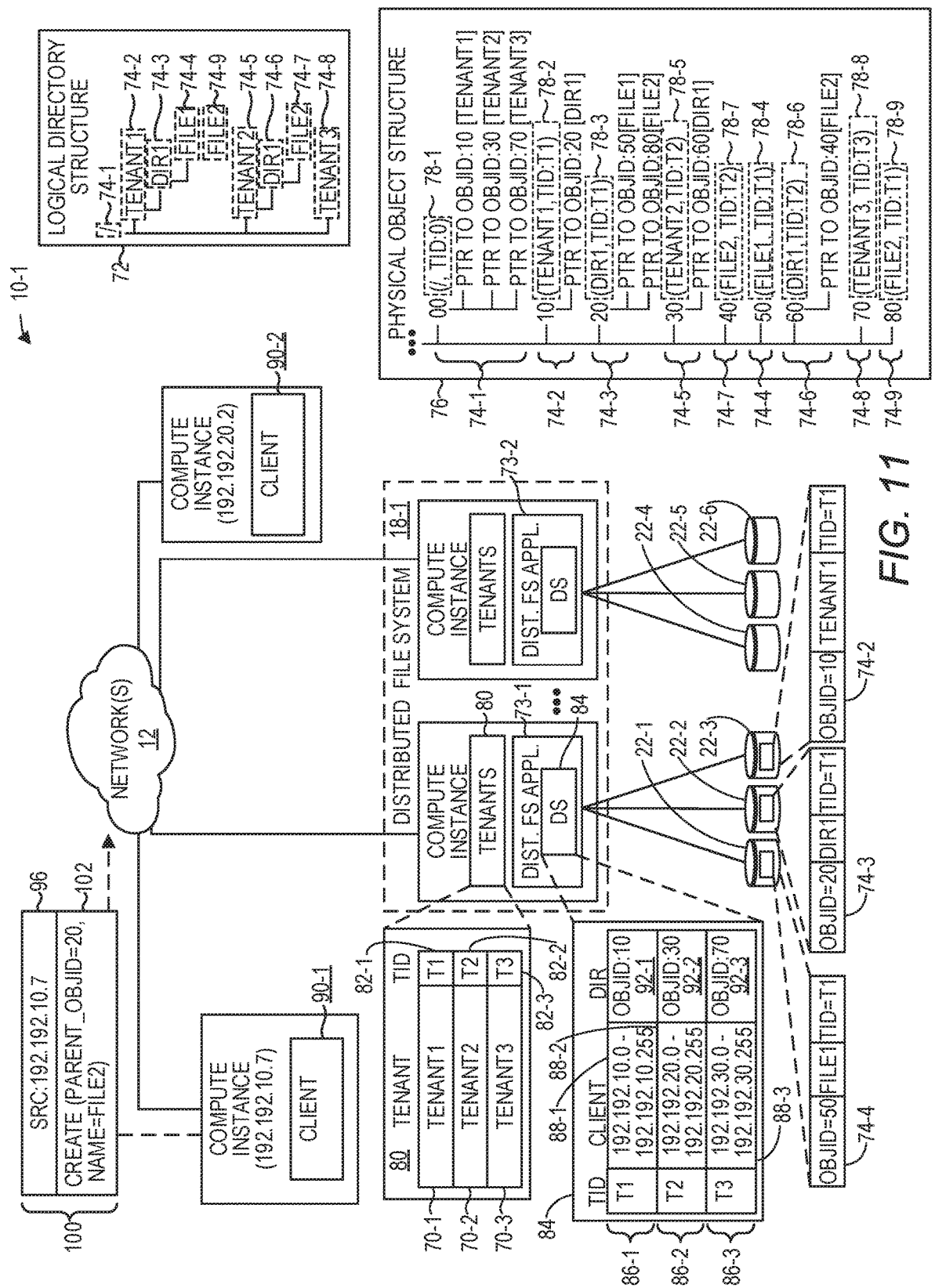
FIG. 11 is a block diagram of the environment illustrated in FIG. 9 illustrating a multi-tenant FS processing a request from a client to create a new object file according to one example.

FIG. 11 is a block diagram of the environment 10-1 illustrated in FIG. 9 illustrating the multi-tenant FS 18-1 processing another request sent by the client 90-1 according to one example. In this example, the client 90-1 sends a request 100 to create a new object file 74 (FILE2). The request 100 includes the IP address 96 used by the client 90-1, and an access request command 102 that includes the unique object ID (20) of the directory object 74 in which the new object file 74 is to be created, and the name of the new object file 74. The FS 18-1 receives the request 100 from the client 90-1, and determines that the client 90-1 is associated with the tenant 70-1 based on the data structure 84. Because the request 100 identifies the object 74-3 (DIR1) as the directory object 74 in which the new object file 74 will be created, the FS 18-1 accesses the metadata 78-3 associated with the object 74-3, and determines that the object 74-3 is also associated with the tenant 70-1. Because the tenant 70 with which the client 90-1 is associated matches the tenant 70 of the directory object 74 in which the client 90-1 desires to create the new file object 74, the FS 18-1 generates a new file object 74-9. Based on a hash of the name FILE2, the FS 18-1 stores the new file object 74-9 on one of the storage nodes 22. The FS 18-1 generates metadata 78-9 that is associated with the file object 74-9 that identifies the file object 74-9 as being associated with the same tenant 70 as the directory object 74-3, in this example, the tenant 70-1. The physical representation 76 depicts the new file object 74-9, as well as the addition of a pointer to the directory object 74-3 to indicate that the new file object 74-9 is stored in the directory object 74-3.

Figure 12:
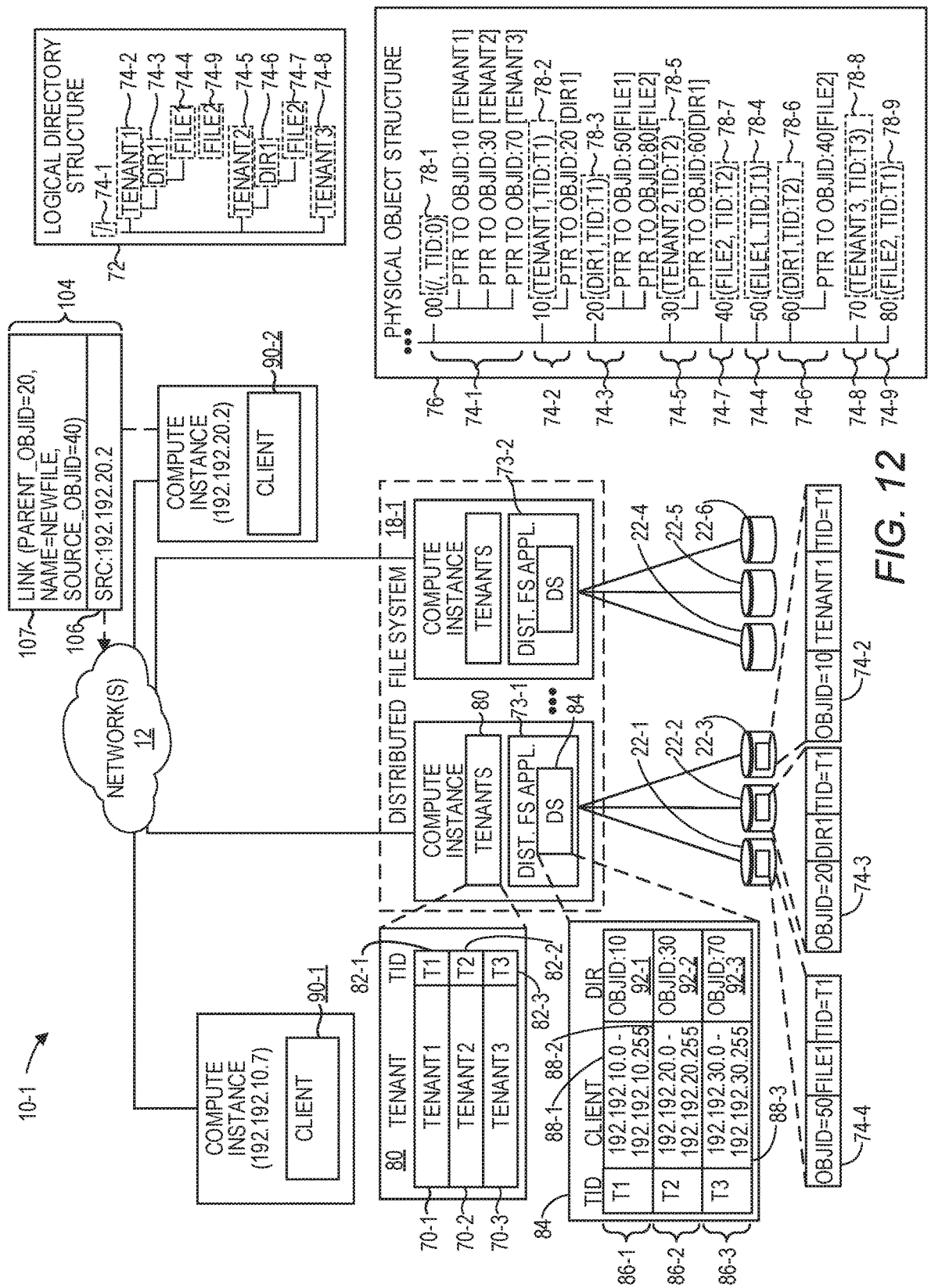
FIG. 12 is a block diagram of the environment illustrated in FIG. 11 illustrating a multi-tenant FS processing a request from a client to generate a link to an existing object file according to one example.

FIG. 12 is a block diagram of the environment 10-1 illustrated in FIG. 11 illustrating the multi-tenant FS 18-1 processing a request 104 from the client 90-2 to generate a link to an existing object file 74 according to one example. In this example, the client 90-2 sends the request 104 to create a new file object 74 that links (sometimes referred to as an alias) to an existing file object file 74-7. The request 104 includes an IP address 106 used by the client 90-2, and an access request command 107 that includes the unique object ID (20) of the directory object 74 in which the new object file 74 (NEWFILE) is to be created, and the object ID (40) of the object file 74-7 (FILE2) to which the new object file 74 is to be linked. The FS 18-1 receives the request 104 from the client 90-2, and determines that the client 90-2 is associated with the tenant 70-2 based on the data structure 84. Because the request 104 identifies the object 74-3 (DIR1) as the directory object 74 in which the new object file 74 (NEWFILE) will be created, the FS 18-1 accesses the metadata 78-3 associated with the object 74-3, and determines that the object 74-3 is associated with the tenant 70-1. Because the object 74-3 is associated with a different tenant 70 than the client 90-2, the FS 18-1 denies the request.

Figure 13:
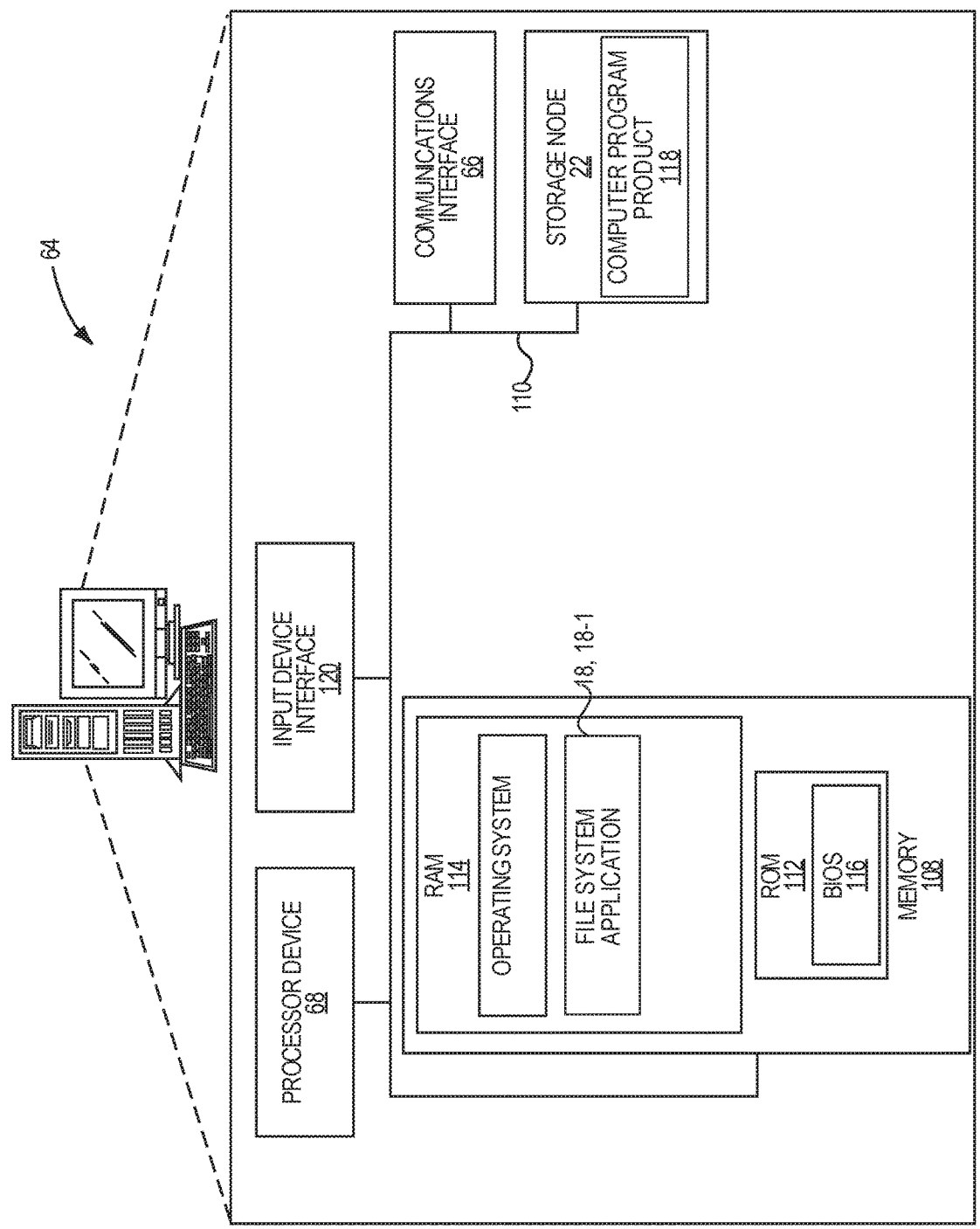
FIG. 13 is a block diagram of a computing device suitable for implementing examples according to one example.

FIG. 13 is a block diagram of the computing device 64 suitable for implementing examples. The computing device 64 may comprise any computing or electronic device capable of including firmware, hardware, and/or executing software instructions to implement the functionality described herein, such as a computer server, a desktop computing device, a laptop computing device, or the like.

The computing device 64 includes the processor device 68, a system memory 108, and a system bus 110. The system bus 110 provides an interface for system components including, but not limited to, the system memory 108 and the processor device 68. The processor device 68 can be any commercially available or proprietary processor device.

The system bus 110 may be any of several types of bus structures that may further interconnect to a memory bus (with or without a memory controller), a peripheral bus, and/or a local bus using any of a variety of commercially available bus architectures. The system memory 108 may include non-volatile memory 112 (e.g., read-only memory (ROM), erasable programmable read-only memory (EPROM), electrically erasable programmable read-only memory (EEPROM), etc.), and volatile memory 114 (e.g., random-access memory (RAM)). A basic input/output system (BIOS) 116 may be stored in the non-volatile memory 112 and can include the basic routines that help to transfer information between elements within the computing device 64. The volatile memory 114 may also include a high-speed RAM, such as static RAM, for caching data.

The computing device 64 may further include or be coupled to a non-transitory computer-readable storage medium such as the storage node 22, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage node 22 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage node 22 and in the volatile memory 114, including an operating system and one or more programs, such as one or both of the file system applications 18, 18-1, which may implement the functionality described herein in whole or in part. All or a portion of the examples may be implemented as a computer program product 118 stored on a transitory or non-transitory computer-usable or computer-readable storage medium, such as the storage node 22, which includes complex programming instructions, such as complex computer-readable program code, to cause the processor device 68 to carry out the steps described herein. Thus, the computer-readable program code can comprise software instructions for implementing the functionality of the examples described herein when executed on the processor device 68. The processor device 68, in conjunction with the file system application 18 or file system 18-1 in the volatile memory 114, may serve as a controller, or control system, for the computing device 64 that is to implement the functionality described herein.

An operator may also be able to enter one or more configuration commands through a keyboard (not illustrated), or a pointing device such as a mouse (not illustrated). Such input devices may be connected to the processor device 68 through an input device interface 120 that is coupled to the system bus 110 but can be connected by other interfaces such as a parallel port, an Institute of Electrical and Electronic Engineers (IEEE) 1394 serial port, a Universal Serial Bus (USB) port, an IR interface, and the like.

The computing device 64 may also include the communications interface 66 suitable for communicating with the network 12 as appropriate or desired.

The examples facilitate efficient object access authorization in a manner that is highly secure and highly efficient, and thus is very scalable. Notably, the client does not participate in the association between a TID and the connection of the client, which is handled by the FS 18-1, and does not participate in identifying objects 74 as being associated with particular tenants 70. Among other advantages, this ensures security and protection even from malicious clients 90 that are able to change their information associated with their connections. Moreover, this eliminates a concern in multi-tenant file systems where two objects are assigned identical object identifiers, because even with the same object IDs, one tenant 70 cannot access objects of the other tenant 70 because the TIDs associated with the objects will differ.

The following are additional examples. Example 1 is a computing device comprising a means for receiving, by a file system (FS) from a first client application of a plurality of client applications, a request to access an object, the request including a unique object identifier (ID) that identifies the object, a means for determining, based on a data structure maintained by the file system and inaccessible to the first client compute instance, that the first client application is associated with a particular security group of a plurality of different security groups, a means for determining, based on metadata of the object, that the object is associated with the particular security group, and a means for granting access to the object by the first client.

Example 2 is the computing device of example 1 wherein the first object is one of a set of objects in a path of objects from a root object to the first object, each object of the set of objects has associated metadata, and wherein the means for determining, based on metadata of the object, that the object is associated with the particular security group, further comprises means for determining that the first object is associated with the first security group without accessing the metadata associated with any object in the path of objects except the first object.

Example 3 is a computing system comprising an object request processing module for receiving, by an FS from a first client application of a plurality of client applications, a request to access an object, the request including a unique object ID that identifies the object, a security group determination module for determining, based on a data structure maintained by the FS and inaccessible to the first client compute instance, that the first client application is associated with a particular security group of a plurality of different security groups, an object security group determination module for determining, based on metadata of the object, that the object is associated with the particular security group, and an access granting module for granting access to the object by the first client.

Example 4 is a method that includes receiving, from a first client application of a plurality of client applications in a multi-tenant distributed FS, a request to generate a new file object, the request including an object ID that identifies a directory object in which the new file object is to be created, determining a corresponding security group associated with the first client application based on a data structure maintained by the multi-tenant distributed FS that is not accessible by the first client application, determining that the security group associated with the directory object in which the new file object is to be created matches the security group of the first client application, and generating the new file object.

Example 5 is the method of example 4 further including generating metadata that is associated with the new file object that contains a security group identifier that identifies the new file object as being associated with a same security group as the directory object.

Example 6 is a method that includes receiving, by a multi-tenant FS, from a client application of a plurality of client applications, a request to generate a first object that points to a second object, the request including a first unique object ID that identifies a directory object in which the first object is to be stored and a second ID that identifies the second object, determining, based on a data structure maintained by the multi-tenant FS and inaccessible to the client application, that the client application is associated with a first security group of a plurality of different security groups, determining, based on metadata of the directory object, that the directory object is associated with the first security group, determining, based on metadata of the first object, that the first object is associated with the first security group, and granting the request to generate the first object that points to the second object.

Example 7 is a method comprising maintaining, by a multi-tenant FS executing on at least one processor device, a unique tenant identifier (ID) for each tenant in the multi-tenant FS, receiving, by the multi-tenant FS, from a first client of the plurality of clients, a request to access a first object maintained by the multi-tenant FS, determining, by the multi-tenant FS, based at least in part on a data structure inaccessible to the client application, the corresponding tenant ID associated with the first client, determining that a tenant ID associated with the first object matches the corresponding tenant ID associated with the first client, and providing the access to the first object based on determining that the tenant ID associated with the first object matches the corresponding tenant ID associated with the first client.

Example 8 is the method of example 7 wherein the first object comprises one of a directory object and a file object.

Example 9 is the method of example 7 wherein the first object is one of a set of objects in a path of objects from a root object to the first object.

Example 10 is the method of example 9 wherein each object of the set of objects has associated metadata, and further comprising determining the tenant ID associated with the first object without accessing the metadata associated with any object in the path of objects except the first object.

Example 11 is the method of example 7 wherein the FS is a distributed file system that randomly stores objects on different storage nodes.

Example 12 is the method of example 7 wherein the FS randomly stores objects on different nodes by receiving a request to create a new file object, the request including a filename of the new file object, hashing the filename of the new file object to create a hash value, and creating the new file object on a first node of a plurality of different nodes based on the hash value.

Example 13 is the method of example 7 further comprising, for each respective tenant, generating a unique directory object under which all subsequent file objects and subdirectory objects associated with the respective tenant will be stored, and identifying the directory as being associated with the respective tenant.

Example 14 is a computing device comprising a communications interface configured to communicate with a network, and a processor device coupled to the communications interface that is to maintain, by a multi-tenant FS executing on at least one processor device, a unique tenant identifier (ID) for each tenant in the multi-tenant FS, receive, by the multi-tenant FS, from a first client of the plurality of clients, a request to access an object maintained by the multi-tenant FS, determine, by the multi-tenant FS, based at least in part on a data structure inaccessible to the client application, the corresponding tenant ID associated with the first client, determine that a tenant ID associated with the object matches the corresponding tenant ID associated with the first client, and provide the access to the object based on determining that the tenant ID associated with the object matches the corresponding tenant ID associated with the first client.

Example 15 is a computer program product stored on a non-transitory computer-readable storage medium and including instructions configured to cause a processor device to maintain, by a multi-tenant FS executing on at least one processor device, a unique tenant identifier (ID) for each tenant in the multi-tenant FS, receive, by the multi-tenant FS, from a first client of the plurality of clients, a request to access an object maintained by the multi-tenant FS, determine, by the multi-tenant FS, based at least in part on a data structure inaccessible to the client application, the corresponding tenant ID associated with the first client, determine that a tenant ID associated with the object matches the corresponding tenant ID associated with the first client, and provide the access to the object based on determining that the tenant ID associated with the object matches the corresponding tenant ID associated with the first client.

Example 16 is a method comprising receiving a request by a client to connect to a file system (FS), authenticating the client, deriving identification data associated with the client, storing the identification data, receiving a subsequent request from the client to access an object maintained by the FS, determining based on the request and the stored identification information that the client is associated with a particular tenant, accessing only the metadata associated with the object without accessing the metadata of any other object and determining that the object is associated with the particular tenant, and allowing the request to proceed based on determining that the object is associated with the particular tenant.

Example 17 is a method comprising receiving a request by a client to connect to a file system (FS), authenticating the client, deriving identification data associated with the client, storing the identification data, receiving a subsequent request from the client to access an object maintained by the FS, determining based on the request and the stored identification information that the client is associated with a particular tenant, accessing only the metadata associated with the object without accessing the metadata of any other object and determining that the object is associated with the particular tenant, and allowing the request to proceed based on determining that the object is associated with the particular tenant.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a file system (FS) executing on at least one processor device, from a first client application of a plurality of client applications, a first request to access a first object, the first request including a unique object ID that identifies the first object;

determining, based on a data structure maintained by the FS and inaccessible to the first client application, that the first client application is associated with a first security group of a plurality of different security groups;

determining, based on metadata of the first object, that the first object is associated with the first security group; and responsive to determining that the first object is associated with the first security group, granting the first client application access to the first object.

2. The method of claim 1 wherein the first object comprises one of a directory object and a file object.

3. The method of claim 1 wherein the first object is one of a set of objects in a path of objects from a root object to the first object.

4. The method of claim 3 wherein each object of the set of objects has associated metadata, and further comprising determining that the first object is associated with the first security group without accessing the metadata of any object in the path of objects except the first object.

5. The method of claim 1 wherein the FS provides file system services to a plurality of different tenants, and each security group corresponds to a different tenant.

6. The method of claim 1 wherein the FS is a distributed file system that randomly stores objects on different nodes.

7. The method of claim 1 wherein the FS randomly stores objects on different nodes by:
  receiving a request to create a new file object, the request including a filename of the new file object;
  hashing the filename of the new file object to create a hash value; and
  creating the new file object on a first node of a plurality of different nodes based on the hash value.

8. The method of claim 1 wherein determining, based on the data structure maintained by the FS and inaccessible to the first client application, that the first client application is associated with the first security group of the plurality of different security groups further comprises:
  determining an IP address associated with the first client application; and
  accessing the data structure using the IP address to determine the first security group, wherein the data structure comprises entries that correlate a plurality of IP addresses to a corresponding plurality of security groups.

9. The method of claim 1 wherein determining, based on the data structure maintained by the FS and inaccessible to the first client application, that the first client application is associated with the first security group of the plurality of different security groups further comprises:
  accessing the data structure to determine a directory object associated with the first client application; and
  accessing metadata associated with the directory object that identifies the first security group.

10. The method of claim 1 further comprising:
  for each respective security group, generating a unique directory object under which all subsequent file objects and subdirectory objects associated with the respective security group will be stored; and
  identifying the unique directory object as being associated with the respective security group.

11. The method of claim 1 further comprising:
  receiving, from the first client application, a request to generate a new file object, the request including an object ID that identifies a directory object in which the new file object is to be created;
  determining the corresponding security group associated with the first client application based on the data structure;
  determining that a security group associated with the directory object in which the new file object is to be created matches the first security group associated with first client application;
  allowing the first client application to generate the new file object; and
  altering metadata associated with the new file object to identify the new file object as being associated with the security group associated with directory object.

12. The method of claim 1 further comprising:
  receiving, from a second client application, a second request to access the first object, the second request including the unique object ID that identifies the first object;
  determining, based on the data structure, that the second client application is associated with a second security group of the plurality of different security groups;
  determining, based on the metadata of the first object, that the first object is associated with the first security group; and
  responsive to determining that the first object is associated with the first security group, denying the second client application access to the first object.

13. The method of claim 1 wherein the first request including the unique object ID that identifies the first object does not include data that identifies a directory in which the first object is stored.

14. The method of claim 1 further comprising:
  receiving, by the FS, from a second client application of the plurality of client applications, a request to generate a first link object that points to the first object, the request to generate the first link object including a first unique object ID that identifies a directory object in which the first link object is to be stored and a second ID that identifies the first object;
  determining, based on the data structure, that the second client application is associated with a second security group of the plurality of different security groups;
  determining, based on metadata of the directory object, that the directory object is associated with a security group other than the second security group; and
  responsive to determining that the directory object is associated with a security group other than the second security group, denying the request to generate the first link object.

15. The method of claim 1 further comprising:
  receiving, by the FS, from a second client application of the plurality of client applications, a request to generate a first link object that points to the first object, the request to generate the first link object including a first unique object ID that identifies a directory object in which the first link object is to be stored and a second ID that identifies the first object;
  determining, based on the data structure, that the second client application is associated with the first security group of the plurality of different security groups;
  determining, based on metadata of the directory object, that the directory object is associated with the first security group;
  determining, based on metadata of the first object, that the first object is associated with the first security group; and responsive to determining that the first object is associated with the first security group, granting the request to generate the first link object.

16. A computing device comprising:
   a communications interface to communicate with a network; and
   a processor device coupled to the communications interface, the processor device to:
      receive, from a first client application of a plurality of client applications, a request to access a first object, the request to access the first object including a unique object ID that identifies the first object;
      determine, based on a data structure maintained by the processor device, that the first client application is associated with a first security group of a plurality of different security groups;
      determine, based on metadata of the first object, that the first object is associated with the first security group; and
      responsive to determining that the first object is associated with the first security group, grant the first client application access to the first object.

17. The computing device of claim 16 wherein the first object is one of a set of objects in a path of objects from a root object to the first object.

18. The computing device of claim 16 wherein each object of the set of objects has associated metadata, and wherein the processor device is further to determine that the first object is associated with the first security group without accessing the metadata of any object in the path of objects except the first object.

19. A non-transitory computer-readable storage medium including instructions to cause a processor device to:
   receive, from a first client application of a plurality of client applications, a request to access a first object, the request to access the first object including a unique object ID that identifies the first object;
   determine, based on a data structure maintained by the processor device, that the first client application is associated with a first security group of a plurality of different security groups;
   determine, based on metadata of the first object, that the first object is associated with the first security group; and
   responsive to determining that the first object is associated with the first security group, grant the first client application access to the first object.

20. The non-transitory computer-readable storage medium of claim 19 wherein the first object is one of a set of objects in a path of objects from a root object to the first object, each object of the set of objects having associated metadata, and wherein the instructions are further to cause the processor device to determine that the first object is associated with the first security group without accessing the metadata of any object in the path of objects except the first object.

* * * * *